United States Patent [19]

MacFarlane et al.

[11] Patent Number: 5,661,629
[45] Date of Patent: Aug. 26, 1997

[54] HIGH CONDUCTIVITY CROSSLINKED ELECTROLYTE MATERIALS AND CAPACITORS INCORPORATING THE SAME

[76] Inventors: Douglas Robert MacFarlane, 157 Cochrane Street, Elsternwick, Victoria 3185; Alice Voelkel, 6 Judy Street, Noble Park, Victoria 3174, both of Australia

[21] Appl. No.: 467,040

[22] Filed: Jun. 6, 1995

[51] Int. Cl.[6] .............................. H01G 9/02; H01G 9/035
[52] U.S. Cl. ..................... 361/505; 361/503; 361/508; 361/512; 361/516
[58] Field of Search .................... 361/505, 525, 361/526, 527, 323, 311, 312, 313, 314, 315, 502, 503, 504, 508, 511, 512, 516, 528, 530, 532; 29/25.03, 25.42; 252/578, 62.2

[56] References Cited

U.S. PATENT DOCUMENTS 4,942,501  7/1990  MacFarlane et al. ................ 361/528
5,086,374  2/1992  MacFalane et al. .................. 361/525
5,146,391  9/1992  MacFarlane et al. ................ 361/525
5,153,820  10/1992 MacFarlane et al. ................ 361/525
5,204,196  4/1993  Yokomichi et al. .................. 429/192

FOREIGN PATENT DOCUMENTS 4-184811  7/1992  Japan .

*Primary Examiner*—Leo P. Picard
*Assistant Examiner*—Anthony Dinkins
*Attorney, Agent, or Firm*—Gottlieb, Rackman & Reisman

[57] ABSTRACT

Elastomeric polymer electrolytes are provided for use in electrical energy storage devices such as aluminum electrolytic capacitors and batteries. The electrolytes contain two or more salts of approximately equal concentration, such that the salt mixture has a much higher combined solubility than any single salt in the mixture, resulting in electrolytes that provide higher conductivity and resulting in storage devices with improved ESR. Methods of making such electrolytes and storage devices are also disclosed.

48 Claims, 2 Drawing Sheets

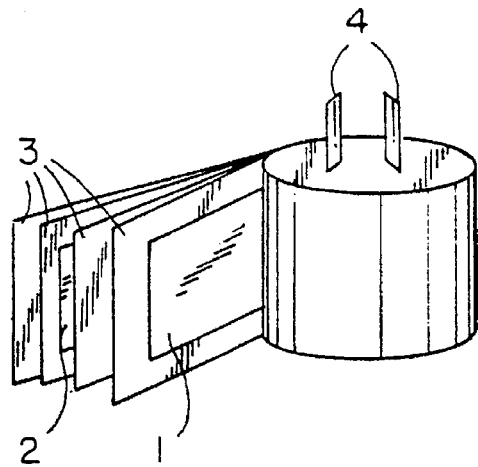 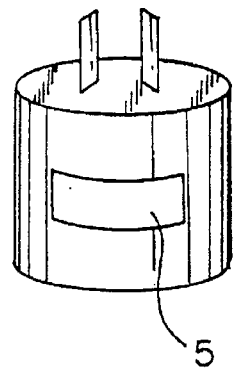
FIG. 1  FIG. 1a
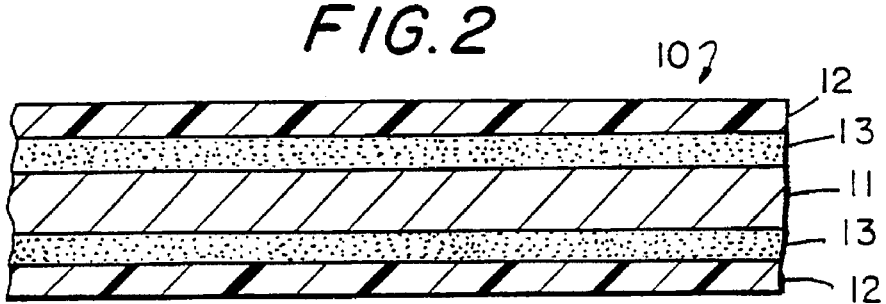
FIG. 2
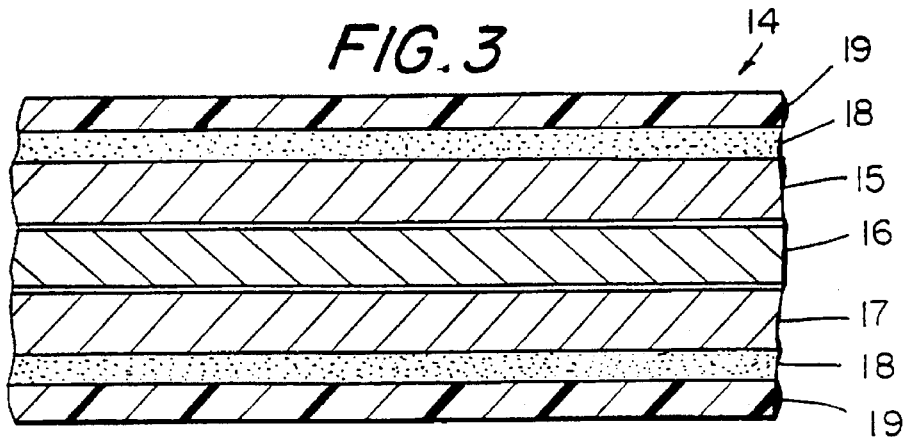
FIG. 3

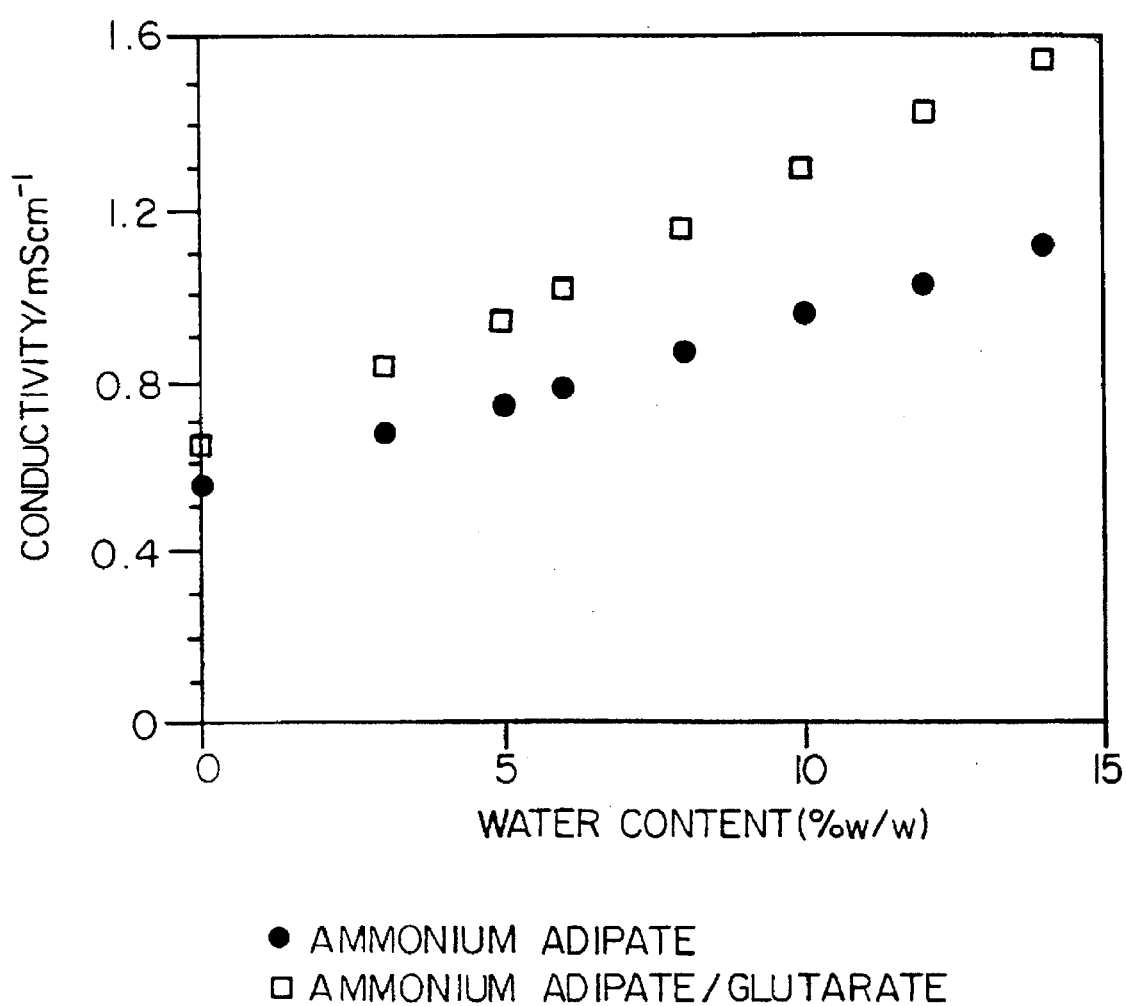

HIGH CONDUCTIVITY CROSSLINKED ELECTROLYTE MATERIALS AND CAPACITORS INCORPORATING THE SAME

TECHNICAL FIELD

This invention relates to electrical energy storage devices such as electrolytic capacitors and batteries. More particularly, although not necessarily limited to such, it relates to electrolytic capacitors which utilize an elastomeric electrolyte and to methods of making such capacitors. Even more particularly, it relates to crosslinked elastomeric electrolytes for use in aluminum electrolytic capacitors, and to methods of making such electrolytes. A major feature of these capacitors is that they employ an elastomeric electrolyte in which two or more ionic salts are dissolved. The invention finds particular suitability for use in implantable biomedical electronic devices such as cardiac pacemakers and defibrillators.

BACKGROUND ART

Cardiac defibrillators and pacemakers are commonly designed to be implanted within a human patient. Such cardiac defibrillators include an electrical energy storage component as part of a power supply designed to provide repeated burst discharges of several joules of electrical energy. Cardiac pacemakers include similar storage components designed to supply lower energy bursts but much more frequently. Both devices therefore require energy storage components of large capacity in order to reduce the number of occasions on which the device must be explanted to renew its energy storage component. It is therefore advantageous that the energy storage component be both compact and capable of large energy storage. It is also advantageous if the energy storage component can be configured to the shape of the overall device, which is typically a flat, disc-shaped configuration to facilitate implantation subcutaneously in the patient. It is well known that aluminum electrolytic capacitors have some properties that are suited for this purpose.

A capacitor of this type conventionally includes an etched aluminum foil anode, an aluminum foil or film cathode, and an interposed Kraft paper or fabric gauze separator impregnated with a solvent-based liquid electrolyte. Typically, the electrolytic or ion-producing component of the electrolyte is a salt that is dissolved in the solvent. The electrolyte thus provides ionic electrical conductivity from the cathode to an oxide layer that is typically formed on the aluminum anode and that functions as a dielectric layer between the anode and the cathode.

Conventionally, the entire laminate is rolled up into the form of a substantially cylindrical body that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered structure of electrode materials with separators interposed therebetween.

Conventional capacitors that employ a liquid electrolyte are subject to leakage, which can damage electrical components and lead to failure of the device. Sealing the device hermetically is not an adequate solution of this problem because of gases that may build up within the device. Expansion chambers adapted to receive the gases have been provided to deal with such problems, but that has led to the disadvantage of even a larger size of the capacitor. Moreover, a liquid electrolyte commonly causes the aluminum oxide dielectric layer on the aluminum anode to de-form, and although the potential across the electrodes can result in currents that re-form the oxide layer, the de-formation results in a shorter lifetime of the formed oxide layer.

U.S. Pat. No. 4,942,501 and its continuations, U.S. Pat. Nos. 5,146,391 and 5,153,820, suggested overcoming these problems by replacing the liquid electrolyte; they provided an electrolytic capacitor that instead employed, between its anode and cathode, a layer of solid electrolyte comprising a solid solution of a metal salt in a polymer matrix, thereby completely eliminating the need for a mechanical separator. These capacitors are immune to leakage and are smaller than prior electrolytic capacitors of comparable construction and operating properties. The preferred method of constructing these capacitors is to deposit onto the surface of the anode a liquid prepolymer electrolyte mixture containing the salt, and then to cause polymerization to take place to cure the electrolyte. The cathode is thereafter formed by deposition upon the surface of the cured electrolyte layer. Similar solid electrolytes are disclosed in Japanese Patent Application No. JP 4-184811, although it is suggested therein that the electrolytes be integrated with a mechanical separator, such as Kraft paper or a porous film or a fabric, so as to increase the mechanical and physical strength of the solid electrolyte.

As noted, these electrolytes differ from conventional aluminum electrolytic capacitor electrolytes in that they are solids; they can exhibit a range of elastomeric material properties ranging from low elastic modulus and high elongation at break, to high elastic modulus and relatively low elongation at break, depending upon the extent to which the polymer is crosslinked. However, in these prior art crosslinked solid polymer electrolytes, limited solubility of the salt in the liquid prepolymer,electrolyte mixture is a common problem.

Most salts exhibit their maximum conductivity at a concentration in excess of 1 mole of salt per kg of solvents (the solvents are typically a mixture of a polymerizable monomer and a plasticizer); however, in some cases the salt of interest is not soluble even to this extent in the desired solvent combination over the desired temperature range. The best achievable prior art solid polymer electrolytes therefore have a conductivity which is less than optimum in some cases. The ESR of capacitors incorporating such electrolytes is undesirably increased as a result. Moreover, this problem becomes even more acute at elevated temperatures (i.e., temperatures in the region 60°–110° C.), since it is known that at such temperatures the solubility of a salt in such a polymer/plasticizer mixture drops below that pertaining at room temperature, as is the case with most non-aqueous solutions. Thus, environmental temperature cycles can result in salt precipitation, which is only very slowly reversed at room temperature.

DISCLOSURE AND BRIEF DESCRIPTION OF THE INVENTION

It is therefore an object of the present invention to provide novel and improved electrolytic capacitors which, by virtue of their structural features, avoid the aforementioned drawbacks and disadvantages.

It is a more specific object of the present invention to provide novel and improved electrolytic capacitors which, by virtue of the chemical composition of the electrolyte, exhibit improved conductivity as compared with electrolytic capacitors heretofore available of comparable construction and operation.

It is a further and even more specific object of the present invention to provide novel and improved and more highly conductive polymer-based electrolytes for use in such electrolytic capacitors.

It is also an object of the present invention to provide methods for making such electrolytic capacitors and electrolytes.

In general, the objectives of the present invention are attained by utilizing, between the anode and cathode of an electrolytic capacitor, an elastomeric electrolyte comprised of a solution of at least two salts in a crosslinked elastomeric solvent. Preferably, the salts are present in substantially equal molar concentrations. The electrolyte is formed by polymerizing a liquid prepolymer electrolyte mixture containing the salts, a plasticizer, at least one polymerizable monomer and a polymerization initiator. Optionally, this mixture may also include water, and it is also optional to include a separate crosslinking agent in the liquid prepolymer electrolyte mixture. A spacer comprised of a Kraft paper separator or other conventional mechanical separator that is impregnated with the electrolyte may also optionally be used.

It is a feature of the present invention that the elastomeric electrolytes described herein contain salt mixtures which have a much higher combined solubility than any single salt in the mixture. The resultant electrolytes thus provide a higher conductivity, and the ESR of the capacitor is thereby improved.

BRIEF DESCRIPTION OF THE DRAWINGS

While the specification concludes with claims particularly defining and distinctly claiming the subject matter regarded as the invention herein, it is believed that the foregoing and other objects, features, characteristics and advantages of the present invention will be more readily and clearly understood from the following description, taken in conjunction with the accompanying drawings in which:

FIG. 1 illustrates an exemplary environment in which the present invention has applicability, namely, a capacitor formed in accordance with a conventional rolled construction;

FIG 1a depicts the means of holding together the conventional rolled construction capacitor of FIG. 1;

FIG. 2 illustrates in a cross-sectional view another exemplary environment in which the present invention has applicability, namely, a capacitor formed in accordance with a known flat layered construction;

FIG. 3 is a cross-sectional view of an alternative embodiment of the layered capacitor construction of FIG. 2, in which there are multiple anodes; and FIG. 4 is a graph showing the enhanced conductivity of an elastomeric electrolyte according to the invention as compared with a prior art electrolyte of similar composition.

MODES FOR CARRYING OUT THE INVENTION

As mentioned hereinabove, capacitors are usually constructed by tightly winding the anode, separator and cathode and holding the roll together with an adhesive tape. As shown in FIG. 1, a capacitor is made by rolling an anode foil 1, with a cathode foil 2, separated by a material such as Kraft paper 3. Connections are made via tabs 4. The rolled construction is conventionally held together as indicated in FIG. 1a by a strip of adhesive tape 5.

The prior art also encompasses flat capacitor constructions, as depicted in FIGS. 2 and 3. Referring to FIG. 2 there is shown in exaggerated form the basic laminate or sandwich layer structure 10 which constitutes one layer of a capacitor. The drawing indicates the anode 11, usually a highly etched foil (the etching is not shown in this view). The cathode is indicated by layers 12. Between the cathode and anode are the separators indicated by layers 13. The layers may comprise the elastomeric electrolyte alone or they may comprise mechanical separators such as Kraft paper impregnated with the elastomeric electrolyte. In the latter case, the electrolyte saturates the separator, and in either case the electrolyte thus provides ionic electrical conductivity from the oxide coating on the anode to the cathode.

The anode can be formed from single, double or multiple plates. FIG. 3 depicts the basic laminate or sandwich layer structure 14 of a multiple anode capacitor, having anodes 15, 16 and 17, separators 18 and cathodes 19. During preparation, the anode is conventionally held in position with respect to the cathode by a press or other means.

A flat or cylindrical low volume, high capacity aluminum electrolytic capacitor may be advantageously constructed in accordance with the invention by interposing, between the electrically conductive anode and cathode thereof, a crosslinked elastomeric electrolyte in which two or more salts are dissolved. The electrolytes which are the subject of this invention are based on a polymeric component which is plasticized by a low molecular weight liquid such as ethylene glycol. In particular, these electrolytes contain:

(i) a polymeric component comprising at least one long chain polymer which is miscible with the other liquid components of the electrolyte, which is crosslinked either by intrinsic chain interactions and crosslinking or by the addition of a crosslinker, and which is compatible with and preferably a solvent for the salt components of the electrolyte.

(ii) a liquid plasticizer of low molecular weight which is miscible with the polymeric component (in both its monomer and polymerized forms) and which is a good solvent for the salt components of the electrolyte;

(iii) two or more ionic salts; and (iv) between 0 and 50% by weight of water.

In general, the mixture of salts should have a variety of cations and anions between or among them. It is well known that each crystalline material reaches an equilibrium with its dissolved ions in solution. By using two or more salts, each having different anions and cations, the total ion concentration can therefore be increased without exceeding the solubility limit of either salt. A similar effect can be observed if the salts have an ion in common, but the magnitude of the possible increase in overall ion concentration is not as great in these cases. Thus, the mixture of salts will preferably contain between them as large a number of ion types as possible. In the cases in which only two salts are used, their molar concentrations will preferably be chosen so as to be substantially equal. However, in the cases in which three or more salts are used, their molar concentrations will preferably be chosen so as to maximize substantially their combined solubility.

The salts are preferably selected from the group consisting of the alkali metal, alkaline earth metal, transition metal, ammonium, substituted ammonium, lead, tin, zinc and cadmium salts of mono-, di-, tri- or tetrabasic acids. The alkali metal and ammonium salts of the lower aliphatic saturated dicarboxylic acids, e.g., pentanedioic (glutaric) acid, hexanedioic (adipic) acid and nonanedioic (azelaic) acid are particularly suited for use in this invention, and most preferably, a mixture of two salts, particularly ammonium glutarate and ammonium adipate, in approximately equal molar concentrations, is utilized.

Preferably, the liquid plasticizer of low molecular weight is ethylene glycol, although other plasticizers such as polyethylene glycol 400, propylene carbonate, dimethyl formamide, dimethylsulfoxide, diethylene glycol and any of the other liquids that are well known in the capacitor electrolyte field may be utilized instead. The content of the plasticizer in the electrolyte can be as high as 80% by weight, but such materials have lower strength than materials having a plasticizer content in the region of 30–70%.

While the electrolyte may generally contain up to 50% by weight of water, this maximum applies primarily to low-voltage capacitors (i.e., those with a working voltage that is less than 250 V); for high-voltage capacitors, it is desirable to limit the amount of water in the electrolyte to no more than about 15% by weight. On the other hand, although in general the water component of the electrolyte optionally can be omitted completely, a minimum water content of about 4% by weight is preferable, regardless of the desired working voltage of the resulting capacitor. Water can be beneficial in that it can increase the conductivity of the electrolyte and decrease the failure rate during initial ageing. On the other hand, the use of too much water can increase the leakage current of the capacitor and accordingly can be detrimental to performance. Most preferably, therefore, the electrolyte of the invention contains about 6% water, and it may be introduced by admixing the appropriate amount of water with the liquid plasticizer component of the electrolyte prior to utilization of the plasticizer.

The polymeric component may be chosen from any of those that have heretofore been utilized in electrolytic capacitors that incorporate solid polymeric electrolytes, particularly including those mentioned in U.S. Pat. Nos. 4,942, 501, 5,146,391 and 5,153,820, the disclosures of which in relevant part are incorporated herein by reference. In general, the polymeric component is chosen so as to include polar groups capable of imparting high solvation power to the polymer. Typical polymeric components that are preferred include polymers of the general structure:

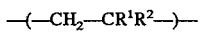

where $R^1$ is an alkyl group or hydrogen and $R^2$ is a group of the type $—(—CH_2CHR^3O—)_n—H$ or of the type $—CO—O—(—CH_2CHR^3O—)_n—H$ where n=0 to 20 and $R^3$ is H or $CH_3$. Among the members of this family of preferred polymers, polyhydroxyethylmethacrylate and polyhydroxyethylacrylate are most preferred. However, other long chain polymers may be utilized, including polyvinylpyrrolidinone, polyvinylsulfonic acid and other vinyl, acrylate and alkacrylate polymers. In addition, copolymers of two or more of the foregoing polymers are also of utility in this invention.

The electrolytes are crosslinked, either intrinsically or by the optional inclusion in the prepolymer mixture of an agent capable of crosslinking the polymer component(s). The crosslinking agent may be a difunctional monomer, for example, a divinyl or diacrylate or dialkacrylate compound. The crosslinking agent can be present at concentrations in the range of from 0.015 to 20% by mole, but preferably in the range 1–4% by mole, calculated on the basis of the total of only the polymerizable components of the electrolyte.

The electrolyte is preferably made up as a liquid prepolymer electrolyte mixture prior to incorporation into the capacitor element, and the polymer is preferably formed in situ thereafter from that prepolymer mixture. The mixture is preferably made up by first dissolving the salts into the liquid plasticizer component by stirring at elevated temperatures, e.g., 65°–90° C., cooling the mixture to room temperature, and then adding to the mixture the monomer(s) corresponding to the desired polymer(s) as well as a polymerization initiator, and optionally the crosslinking agent. Refrigeration and/or maintenance of an oxygen containing atmosphere allows the mixture to be stored for long periods without unwanted polymerization.

The polymerization initiator may be chosen from any of the initiating agents that are well known in the polymerization field, including (a) free radical initiating agents such as potassium persulfate, ammonium persulfate, azoxyisobutyronitrile, benzoyl peroxide and other suitable peroxides and persulfates, as well as any of the foregoing agents in combination with a redox co-initiator such as salts of iron or copper or sodium bisulphite; (b) ionic initiators such as butyl lithium, and (c) co-ordination catalysts such as triethyl-aluminum in combination with titanium trichloride. The choice of the polymerization initiator, and the amount of it to use, are well within the skill of the art.

Because the viscosity of the electrolyte in its prepolymer form is low, the incorporation of the electrolyte into a capacitor element proceeds in the same way as is standard in the art. For example, if the capacitor element will include mechanical separator means (e.g., a Kraft paper or other conventional mechanical separator such as gauze fabric, porous polyethylene or porous polypropylene), then vacuum impregnation may be used. A capacitor in accordance with the present invention may thus be constructed by first assembling at least one capacitor element by disposing mechanical separator means between an anode layer and a cathode layer. The liquid prepolymer electrolyte mixture is then impregnated into the capacitor element by vacuum impregnation as is standard in the capacitor field.

Thereafter, the capacitor element is allowed to stand for a period of between 0.1 and 48 hours for complete paper impregnation to take place, following which the capacitor element is either wound and then placed into a canister or, in the case of flat capacitor elements, placed in a press. The element is then subjected to heat, preferably by placing it into an oven at 55° C. for 3 hours and then at 70° C. for 12 hours, during which time the electrolyte cures into an elastomer. Oxygen acts as a powerful inhibitor for some of the polymerization reactions and it is therefore preferable in those cases that air be excluded from the canister or the press during this stage.

If the capacitor element will not include mechanical separator means, i.e., where it is intended that the electrolyte also act as the separator, then the electrolyte may be applied as a film in any manner that has heretofore been utilized in the prior art, such as the procedures mentioned in U.S. Pat. Nos. 4,942,501, 5,146,391 and 5,153,820 (the disclosures of which in relevant part are incorporated herein by reference), which are preferred.

After polymerization and crosslinking, the resultant materials are transparent elastomeric solids. When a high content of the crosslinking agent is used, the material has a high elastic modulus and a high tensile strength; however, its elongation at break is much reduced as a result. On the other hand, when only a small amount of crosslinking agent is used, or when it is omitted completely, the material is of much lower elastic modulus and lower tensile strength, but has an elongation at break as high as 200%.

The manufacture of electrolytic capacitors embodying the principles of the present invention is further explained by the following examples, which also serve to illustrate the formulation and operation of the materials.

EXAMPLE 1

A solution of 7 parts ammonium adipate and 7 parts ammonium glutarate in 65 parts of ethylene glycol is made up by stirring at elevated temperature. After cooling to room temperature the solution is mixed with 35 parts of 2-hydroxyethylmethacrylate, 1 part of tetraethyleneglycol diacrylate and 0.2 parts of a saturated solution of ammonium persulfate in water. The solution is then stored at or below room temperature until needed.

A spirally wound capacitor element consisting of two layers of anode material, 2 layers of 20 μ thick Kraft paper, a cathode foil and a further two layers of 20 μ thick Kraft paper is impregnated with the electrolyte by removing air from the element under vacuum and then flooding with the electrolyte under vacuum. After the element has been completely impregnated by the electrolyte, the element is removed from the container and pressed into an aluminum canister. The canister is then placed in a container from which air is excluded by flushing with nitrogen and the container placed in an oven at 55° C. for 3 hours and 70° C. for 12 hours during which time the electrolyte cures into an elastomer. The capacitor is then aged by charging to full working voltage at maximum operating temperature.

EXAMPLE 2

A solution of 7 parts ammonium adipate and 7 parts ammonium glutarate in 65 parts of ethylene glycol is made up by stirring at elevated temperatures. After cooling to room temperature the solution is mixed with 35 parts of 2-hydroxyethylmethacrylate, 1 part of tetraethyleneglycol diacrylate and 0.2 parts of a saturated solution of ammonium persulfate in water. The solution is then stored at or below room temperature until needed.

A capacitor element is constructed by interleaving rectangular segments of anode foil 35 mm×45 mm between layers of paper and cathode foil. The element has dimensions 45 mm×35 mm×2.5 mm, and is impregnated with electrolyte under vacuum. In a low oxygen handling chamber, the excess electrolyte is removed and the element placed in a press such that pressure is applied to the large face of the element and the press is placed in a sealed container in an oven at 55° C. for 3 hours and 70° C. for 12 hours, during which time the electrolyte cures into an elastomer. The result is a flat profile capacitor in which the electrolyte acts as a bonding agent to hold the various layers together without any need for compression to be applied via a rigid case.

EXAMPLE 3

A solution of 7 parts ammonium adipate and 8 parts potassium azelate in 65 parts of ethylene glycol is made up by stirring at elevated temperature. After cooling to room temperature the solution is mixed with 35 parts of 2-hydroxyethylmethacrylate, 1 part of tetraethyleneglycol diacrylate and 0.2 parts of a saturated solution of ammonium persulfate in water. The solution is then stored at or below room temperature until needed.

A spirally wound capacitor element consisting of two layers of anode material, 2 layers of 20 μ thick Kraft paper, a cathode foil and a further two layers of 20 μ thick Kraft paper is impregnated with the electrolyte by removing air from the element under vacuum and then flooding with the electrolyte under vacuum. After the element has been completely impregnated by the electrolyte, the element is removed from the container and pressed into an aluminum canister. The canister is then placed in a container from which air is excluded by flushing with nitrogen and the container placed in an oven at 55° C. for 3 hours and 70° C. for 12 hours during which time the electrolyte cures into an elastomer. The capacitor is then aged by charging to full working voltage at maximum operating temperature.

EXAMPLE 4

A solution of 7 parts ammonium adipate and 8 parts potassium azelate in 65 parts of ethylene glycol is made up by stirring at elevated temperatures. After cooling to room temperature the solution is mixed with 35 parts of 2-hydroxyethylmethacrylate, 1 part of tetraethyleneglycol diacrylate and 0.2 parts of a saturated solution of ammonium persulfate in water. The solution is then stored at or below room temperature until needed.

A capacitor element is constructed by interleaving rectangular segments of anode foil 35 mm×45 mm between layers of paper and cathode foil. The element has dimensions 45 mm×35 mm×2.5 mm, and is impregnated with electrolyte under vacuum. In a low oxygen handling chamber, the excess electrolyte is removed and the element placed in a press such that pressure is applied to the large face of the element and the press is placed in a sealed container in an oven at 55° C. for 3 hours and 70° C. for 12 hours, during which time the electrolyte cures into an elastomer. The result is a flat profile capacitor in which the electrolyte acts as a bonding agent to hold the various layers together without any need for compression to be applied via a rigid case.

EXAMPLES 5–8

In these examples, the procedures and chemical components are the same as in Examples 1–4, respectively, except that an amount of water is added to the plasticizer such that about 6% by weight of the final electrolyte is water. The result in each case is an electrolyte with increased conductivity, yielding a capacitor with improved ESR and decreased failure rate, as compared with the electrolytes and corresponding capacitors of the earlier examples in which no water was added to the plasticizer.

EXAMPLES 9–12

In these examples, the procedures and chemical components are the same as in Examples 2, 4, 6, and 8, respectively, except that the tetraethyleneglycol diacrylate content is 0.5 parts and the ammonium persulfate content is 1.0 parts. The result in each case is an electrolyte with improved tensile strength as compared with the electrolytes of the earlier examples in which 1 part of tetraethyleneglycol diacrylate and 0.2 parts of ammonium persulfate were used. The electrolytes of these Examples 9–12 are particularly suited for use in a flat multilayer capacitor construction, wherein they also act as a bonding agent due to their adhesive nature.

The enhanced conductivity of a crosslinked elastomeric electrolyte according to the present invention is illustrated in further detail in the graph of FIG. 4, which shows conductivity as a function of water content for two elastomeric electrolytes, each of which contained 55 parts of ethylene glycol and 45 parts of hydroxyethylmethacrylate in the prepolymer mixture. One of the electrolytes was made in accordance with the invention and contained two salts, ammonium glutarate and ammonium adipate, in a 1:1 molar ratio. For comparison, a second electrolyte was made in accordance with the prior art and contained only one salt, ammonium adipate, which is the standard salt used in high voltage solid electrolyte capacitors. The solubility of the single salt in the electrolyte is 0.483 mole/kg at room temperature, while the solubility of the double salt mixture in the electrolyte is 0.85 mole/kg at room temperature. The results as plotted on the graph of FIG. 1 confirm that the conductivity of the double-salt electrolyte is significantly enhanced as compared with that of the single salt electrolyte.

Although the invention has been described with reference to particular embodiments, it is to be understood that such embodiments are merely illustrative of the application of the principles of the invention. Hence numerous other modifications may be made therein and other arrangements may be devised. While there have been shown and described what are presently considered to be the preferred embodiments of this invention, it will be obvious to those skilled in the art that various other changes may be made without departing from the broader aspects of the invention. It is, therefore, aimed in the appended claims to cover all such changes and modifications as fall within the true spirit and scope of the present invention.

We claim:

1. A low volume, high capacity storage device comprising an electrolytic capacitor having at least one anode layer, at least one cathode layer and a spacer comprising an elastomeric electrolyte disposed therebetween, said electrolyte comprising at least two salts in an ionically conductive carrier of high solvation power.

2. A storage device according to claim 1 wherein the molar concentrations of said at least two salts are substantially equal.

3. A storage device according to claim 1 wherein said at least two salts are selected from the group consisting of the alkali metal, alkaline earth metal, transition metal, ammonium, substituted ammonium, lead, tin, zinc and cadmium salts of mono-, di-, tri- and tetrabasic acids.

4. A storage device according to claim 3 wherein the molar concentrations of said at least two salts are substantially equal.

5. A storage device according to claim 4 wherein said at least two salts are ammonium adipate and ammonium glutarate.

6. A storage device according to claim 4 wherein said at least two salts are ammonium adipate and potassium azelate.

7. A storage device according to claim 1 wherein said carrier comprises a crosslinked polymer matrix.

8. A storage device according to claim 7 wherein said crosslinked polymer matrix comprises (a) a polymeric component and (b) a plasticizer comprising a liquid of low molecular weight in which said at least two salts are soluble.

9. A storage device according to claim 8 wherein said plasticizer is selected from the group consisting of ethylene glycol, polyethylene glycol 400, propylene carbonate, dimethyl formamide, dimethylsulfoxide and diethylene glycol.

10. A storage device according to claim 9 wherein said plasticizer is ethylene glycol.

11. A storage device according to claim 8 wherein said crosslinked polymer matrix further comprises water in an amount not less than about 4% by weight of said electrolyte.

12. A storage device according to claim 11 wherein said capacitor is of the high voltage type, and wherein the amount of water does not exceed about 15% by weight of said electrolyte.

13. A storage device according to claim 11 wherein said capacitor is of the low voltage type, and wherein the amount of water does not exceed about 50% by weight of said electrolyte.

14. A storage device according to claims 11, 12 or 13 wherein the amount of water is about 6% by weight of said electrolyte.

15. A storage device according to claim 8 wherein said polymeric component is a solvent for said at least two salts.

16. A storage device according to claim 15 wherein said polymeric component comprises at least one compound chosen from the group consisting of polyvinylpyrrolidinone, polyvinylsulfonic acid, polyhydroxyethylacrylate, polyhydroxyethylmethacrylate, polymers of the general structure

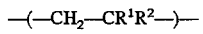

where $R^1$ is an alkyl group or hydrogen and $R^2$ is a group of the type $-(-CH_2CHR^3O-)_n-H$ or of the type $-CO-O-(-CH_2CHR^3O-)_n-H$ where n=0 to 20 and $R^3$ is H or $CH_3$, and copolymers thereof.

17. A storage device according to claim 7 wherein said crosslinked polymer matrix further comprises a crosslinking agent.

18. A storage device according to claim 17 wherein said crosslinking agent comprises a difunctional monomer selected from the group consisting of divinyl, diacrylate and dialkacrylate compounds.

19. A storage device according to claim 18 wherein said crosslinking agent is tetraethyleneglycol diacrylate.

20. A storage device according to claim 7 wherein the molar concentrations of said at least two salts are substantially equal and said at least two salts are selected from the group consisting of the alkali metal, alkaline earth metal, transition metal, ammonium, substituted ammonium, lead, tin, zinc and cadmium salts of mono-, di-, tri- and tetrabasic acids, and wherein said crosslinked polymer matrix comprises (a) a polymeric component in which said at least two salts are soluble and which comprises at least one compound chosen from the group consisting of polyvinylpyrrolidinone, polyvinylsulfonic acid, polyhydroxyethylacrylate, polyhydroxyethylmethacrylate, polymers of the general structure

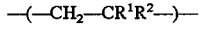

where $R^1$ is an alkyl group or hydrogen and $R^2$ is a group of the type $-(-CH_2CHR^3O-)_n-H$ or of the type $-CO-O-(-CH_2CHR^3O-)_n-H$ where n=0 to 20 and $R^3$ is H or $CH_3$, and copolymers thereof, (b) water in an amount between about 4% and about 50% by weight of said electrolyte, (c) a crosslinking agent which comprises a difunctional monomer selected from the group consisting of divinyl, diacrylate and dialkacrylate compounds, and (d) a plasticizer in which said at least two salts are soluble and which is chosen from the group consisting of ethylene glycol, polyethylene glycol 400, propylene carbonate, dimethyl formamide, dimethylsulfoxide and diethylene glycol.

21. A storage device according to claim 1 wherein said electrolyte comprises poly-2-hydroxyethylmethacrylate, ethylene glycol, ammonium adipate, ammonium glutarate, tetraethyleneglycol diacrylate and water in an amount comprising about 6% by weight of said electrolyte.

22. A storage device according to claim 1 wherein said electrolyte comprises poly-2-hydroxyethylmethacrylate, ethylene glycol, ammonium adipate, potassium azelate, tetraethyleneglycol diacrylate and water in an amount comprising about 6% by weight of said electrolyte.

23. A storage device according to claims 1, 4, 20, 21 or 22 wherein said spacer further comprises mechanical separator means impregnated with said electrolyte.

24. A storage device according to claim 23 wherein said separator means is selected from the group consisting of Kraft paper, gauze fabric, porous polypropylene and porous polyethylene.

25. An elastomeric electrolyte for use in a low volume, high capacity storage device comprising an electrolytic capacitor, said electrolyte comprising at least two salts in an ionically conductive carrier of high solvation power.

26. An electrolyte according to claim 25 wherein the molar concentrations of said at least two salts are substantially equal.

27. An electrolyte according to claim 25 wherein said at least two salts are selected from the group consisting of the alkali metal, alkaline earth metal, transition metal, ammonium, substituted ammonium, lead, tin, zinc and cadmium salts of mono-, di-, tri- and tetrabasic acids.

28. An electrolyte according to claim 27 wherein the molar concentrations of said at least two salts are substantially equal.

29. An electrolyte according to claim 28 wherein said at least two salts are ammonium adipate and ammonium glutarate.

30. An electrolyte according to claim 28 wherein said at least two salts are ammonium adipate and potassium azelate.

31. An electrolyte according to claim 25 wherein said carrier comprises a crosslinked polymer matrix.

32. An electrolyte according to claim 31 wherein said crosslinked polymer matrix comprises (a) a polymeric component and (b) a plasticizer comprising a liquid of low molecular weight in which said at least two salts are soluble.

33. An electrolyte according to claim 32 wherein said plasticizer is selected from the group consisting of ethylene glycol, polyethylene glycol 400, propylene carbonate, dimethyl formamide, dimethylsulfoxide and diethylene glycol.

34. An electrolyte according to claim 33 wherein said plasticizer is ethylene glycol.

35. An electrolyte according to claim 32 wherein said crosslinked polymer matrix further comprises water in an amount not less than about 4% by weight of said electrolyte.

36. An electrolyte according to claim 35 wherein said capacitor is of the high voltage type, and wherein the amount of water does not exceed about 15% by weight of said electrolyte.

37. An electrolyte according to claim 35 wherein said capacitor is of the low voltage type, and wherein the amount of water does not exceed about 50% by weight of said electrolyte.

38. An electrolyte according to claims 35, 36 or 37 wherein the amount of water is about 6% by weight of said electrolyte.

39. An electrolyte according to claim 32 wherein said polymeric component is a solvent for said at least two salts.

40. An electrolyte according to claim 39 wherein said polymeric component comprises at least one compound chosen from the group consisting of polyvinylpyrrolidinone, polyvinylsulfonic acid, polyhydroxyethylacrylate, polyhydroxyethylmethacrylate, polymers of the general structure $$-(-CH_2-CR^1R^2-)-$$

where $R^1$ is an alkyl group or hydrogen and $R^2$ is a group of the type $-(-CH_2CHR^3O-)_n-H$ or of the type $-CO-O-(-CH_2CHR^3O-)_n-H$ where n=0 to 20 and $R^3$ is H or $CH_3$, and copolymers thereof.

41. An electrolyte according to claim 31 wherein said crosslinked polymer matrix further comprises a crosslinking agent.

42. An electrolyte according to claim 41 wherein said crosslinking agent comprises a difunctional monomer selected from the group consisting of divinyl, diacrylate and dialkacrylate compounds.

43. An electrolyte according to claim 42 wherein said crosslinking agent is tetraethyleneglycol diacrylate.

44. An electrolyte according to claim 31 wherein the molar concentrations of said at least two salts are substantially equal and said at least two salts are selected from the group consisting of the alkali metal, alkaline earth metal, transition metal, ammonium, substituted ammonium, lead, tin, zinc and cadmium salts of mono-, di-, tri- and tetrabasic acids, and wherein said crosslinked polymer matrix comprises (a) a polymeric component in which said at least two salts are soluble and which comprises at least one compound chosen from the group consisting of polyvinylpyrrolidinone, polyvinylsulfonic acid, polyhydroxyethylacrylate, polyhydroxyethylmethacrylate, polymers of the general structure $$-(-CH_2-CR^1R^2-)-$$

where $R^1$ is an alkyl group or hydrogen and $R^2$ is a group of the type $-(-CH_2CHR^3O-)_n-H$ or of the type $-CO-O-(-CH_2CHR^3O-)_n-H$ where n=0 to 20 and $R^3$ is H or $CH_3$, and copolymers thereof, (b) water in an amount between about 4% and about 50% by weight of said electrolyte, (c) a crosslinking agent which comprises a difunctional monomer selected from the group consisting of divinyl, diacrylate and dialkacrylate compounds, and (d) a plasticizer in which said at least two salts are soluble and which is chosen from the group consisting of ethylene glycol, polyethylene glycol 400, propylene carbonate, dimethyl formamide, dimethylsulfoxide and diethylene glycol.

45. An electrolyte according to claim 25 which comprises poly-2-hydroxyethylmethacrylate, ethylene glycol, ammonium adipate, ammonium glutarate, tetraethyleneglycol diacrylate and water in an amount comprising about 6% by weight of said electrolyte.

46. An electrolyte according to claim 25 which comprises poly-2-hydroxyethylmethacrylate, ethylene glycol, ammonium adipate, potassium azelate, tetraethyleneglycol diacrylate and water in an amount comprising about 6% by weight of said electrolyte.

47. An electrolyte according to claims 25, 28, 44, 45 or 46 further comprising mechanical separator means into which said electrolyte is impregnated.

48. An electrolyte according to claim 47 wherein said separator means is selected from the group consisting of Kraft paper, gauze fabric, porous polypropylene and porous polyethylene.

* * * * *